US010749460B2

(12) United States Patent
Guo

(10) Patent No.: US 10,749,460 B2
(45) Date of Patent: Aug. 18, 2020

(54) SOLAR SHINGLE ROOFING KIT

(71) Applicant: PV Technical Services Inc., Burlington (CA)

(72) Inventor: Li Hui Guo, Toronto (CA)

(73) Assignee: PV Technical Services Inc., Burlington, Ontario (CA)

(*) Notice: Subject to any disclaimer, the term of this patent is extended or adjusted under 35 U.S.C. 154(b) by 747 days.

(21) Appl. No.: 15/346,983

(22) Filed: Nov. 9, 2016

(65) Prior Publication Data
US 2017/0353144 A1 Dec. 7, 2017

Related U.S. Application Data

(60) Provisional application No. 62/345,223, filed on May 3, 2016.

(51) Int. Cl.
H02S 20/25 (2014.01)
H02S 30/10 (2014.01)

(52) U.S. Cl.
CPC .............. *H02S 20/25* (2014.12); *H02S 30/10* (2014.12); *Y02B 10/12* (2013.01)

(58) Field of Classification Search
CPC .................................. H02S 20/25; H02S 30/10
See application file for complete search history.

(56) References Cited

U.S. PATENT DOCUMENTS

| 4,163,445 | A | * | 8/1979 | Stanger | E04D 3/362 126/632 |
| 4,228,791 | A | * | 10/1980 | Hirai | F24S 25/67 126/623 |
| 5,409,549 | A | * | 4/1995 | Mori | E04D 3/366 136/244 |
| 5,497,587 | A | * | 3/1996 | Hirai | H02S 20/23 52/173.3 |
| 2004/0154655 | A1 | * | 8/2004 | Tanaka | F24S 40/44 136/244 |
| 2005/0005534 | A1 | * | 1/2005 | Nomura | H02S 20/23 52/90.2 |
| 2012/0272591 | A1 | * | 11/2012 | Posnansky | E04D 1/22 52/173.3 |
| 2016/0268958 | A1 | * | 9/2016 | Wildes | F24S 25/70 |

FOREIGN PATENT DOCUMENTS

JP          10-082152 A   *  3/1998  .......... H01L 31/048

* cited by examiner

Primary Examiner — Golam Mowla
(74) Attorney, Agent, or Firm — John H. Thomas, P.C.

(57) ABSTRACT

A solar shingle roofing kit comprises a plurality of crystalline solar panel modules, a central connector for adjoining adjacent solar modules, a starting connector to join a solar module to an eaves or a deck of a roof; left and right closures to join solar modules to the rake edges of a roof or to other kinds of commercial shingles or roof tiles, and a plurality of clamps to fasten the forgoing elements to the deck of a roof. The solar shingle roofing kit allows solar modules to be installed interchangeably with metal roof shingles. The solar shingle roofing kit allows an individual solar module to be removed and replaced without removing neighbouring modules or shingles in the event that a solar module fails.

17 Claims, 16 Drawing Sheets

B - B

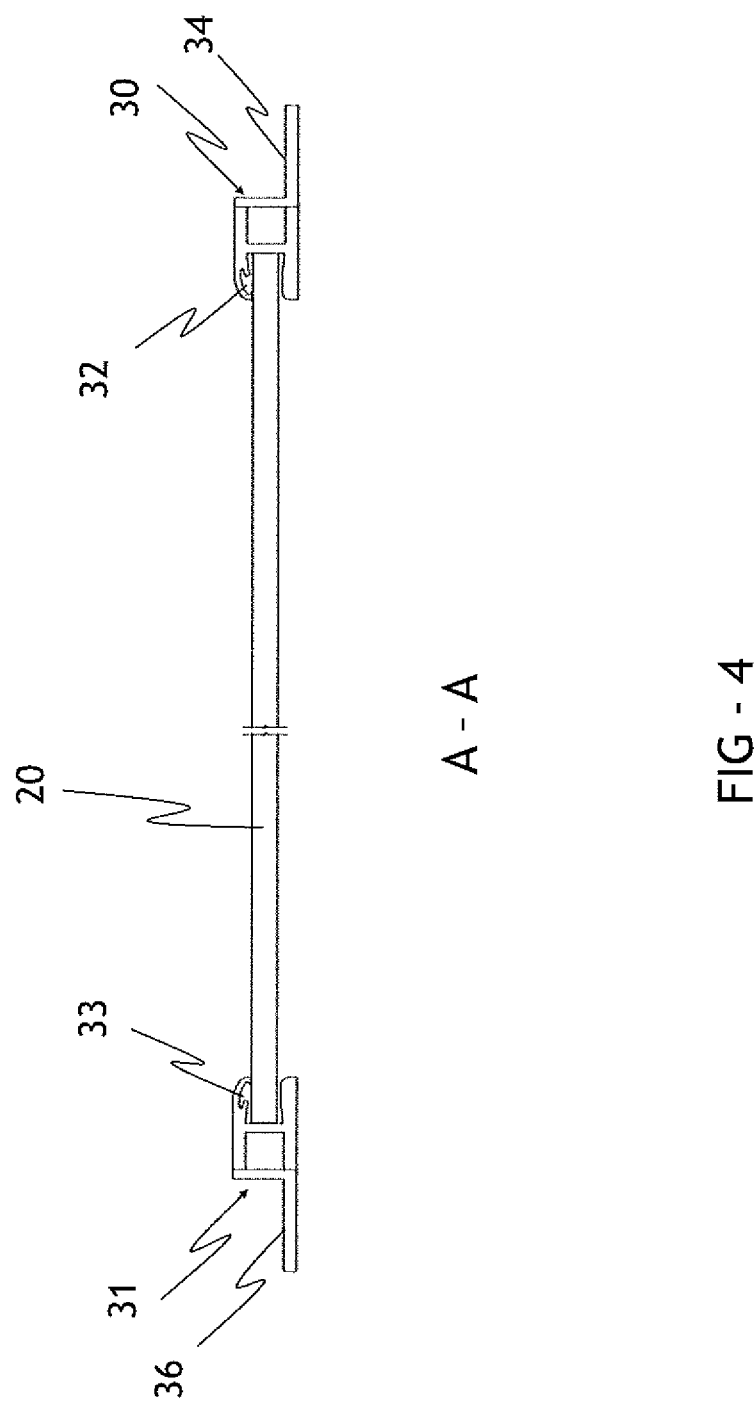

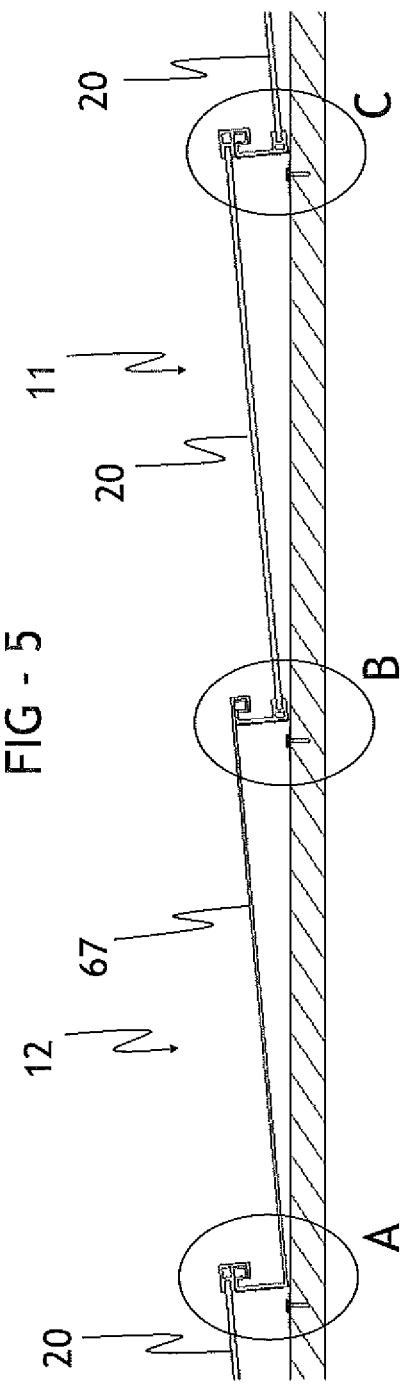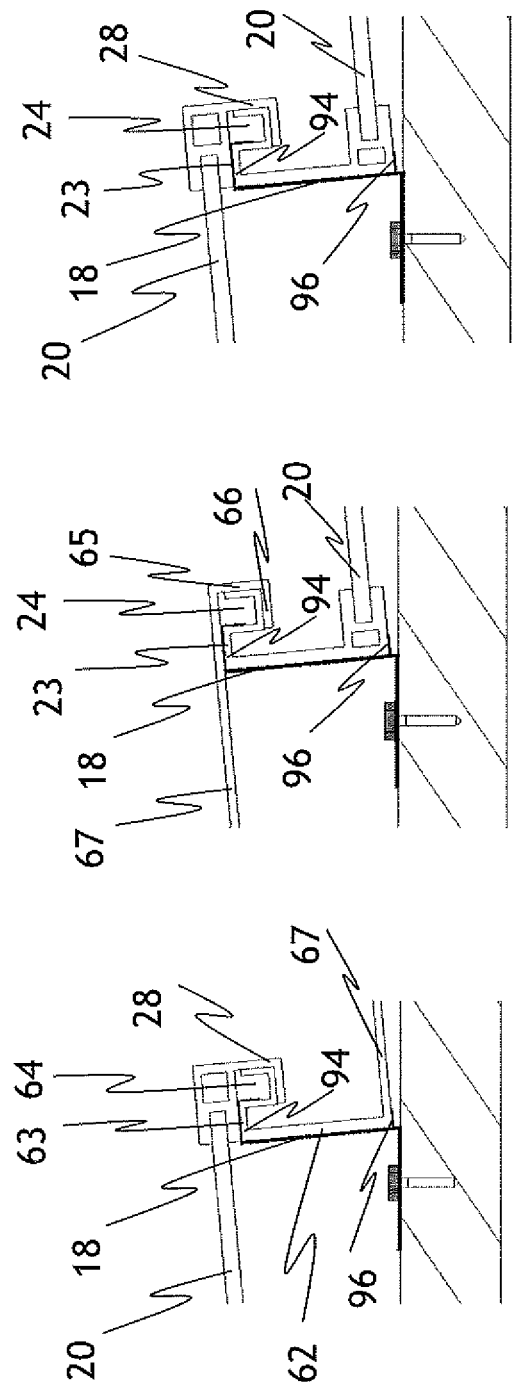

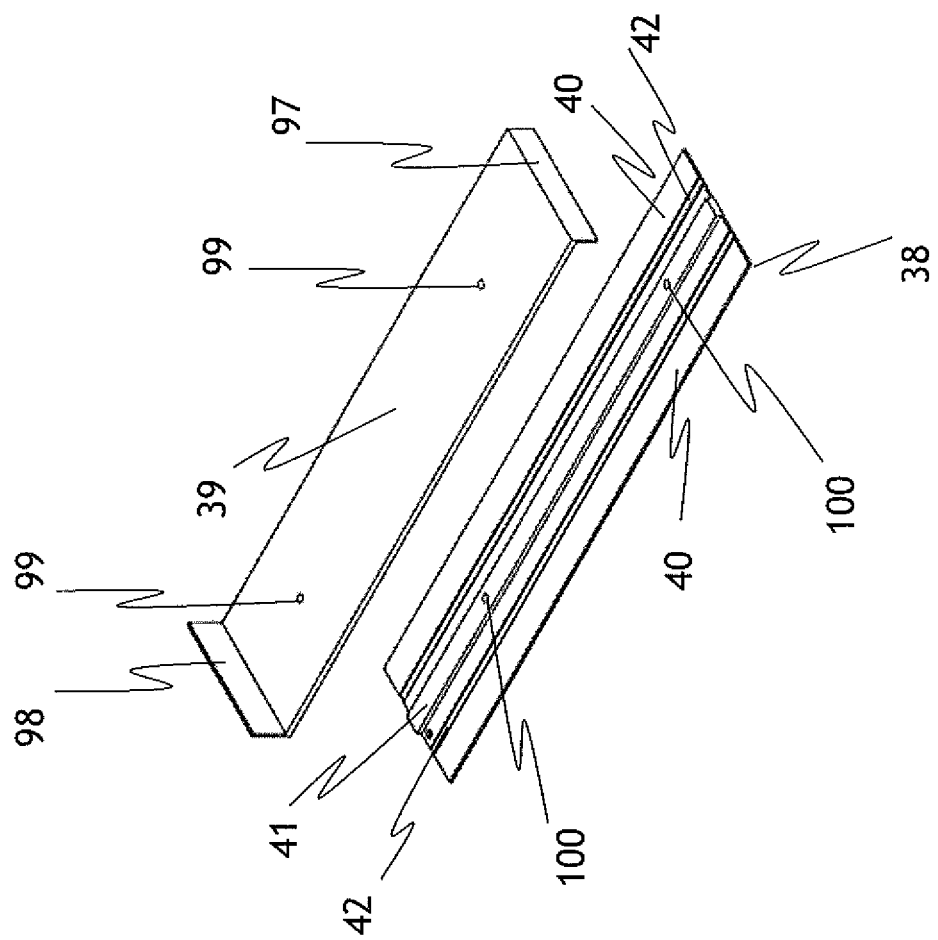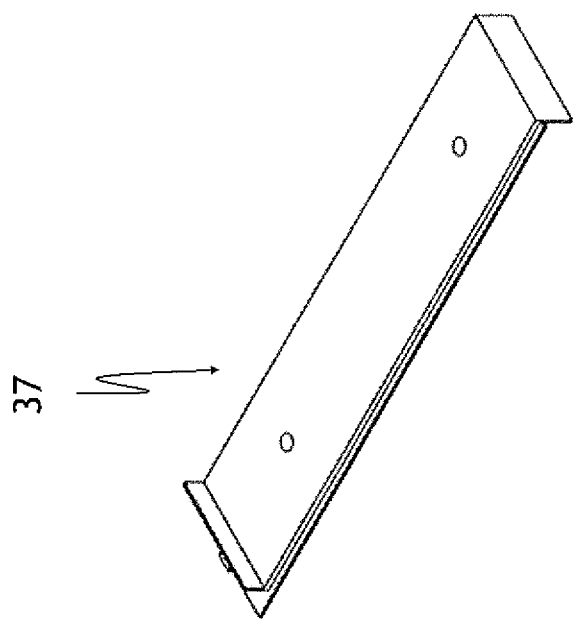
FIG - 9

E - E

F - F

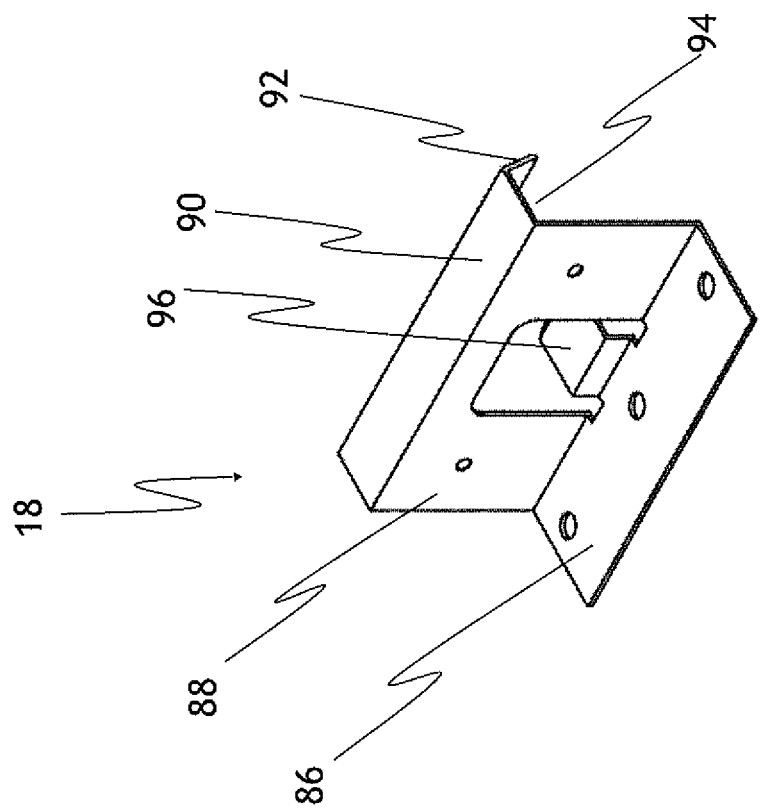

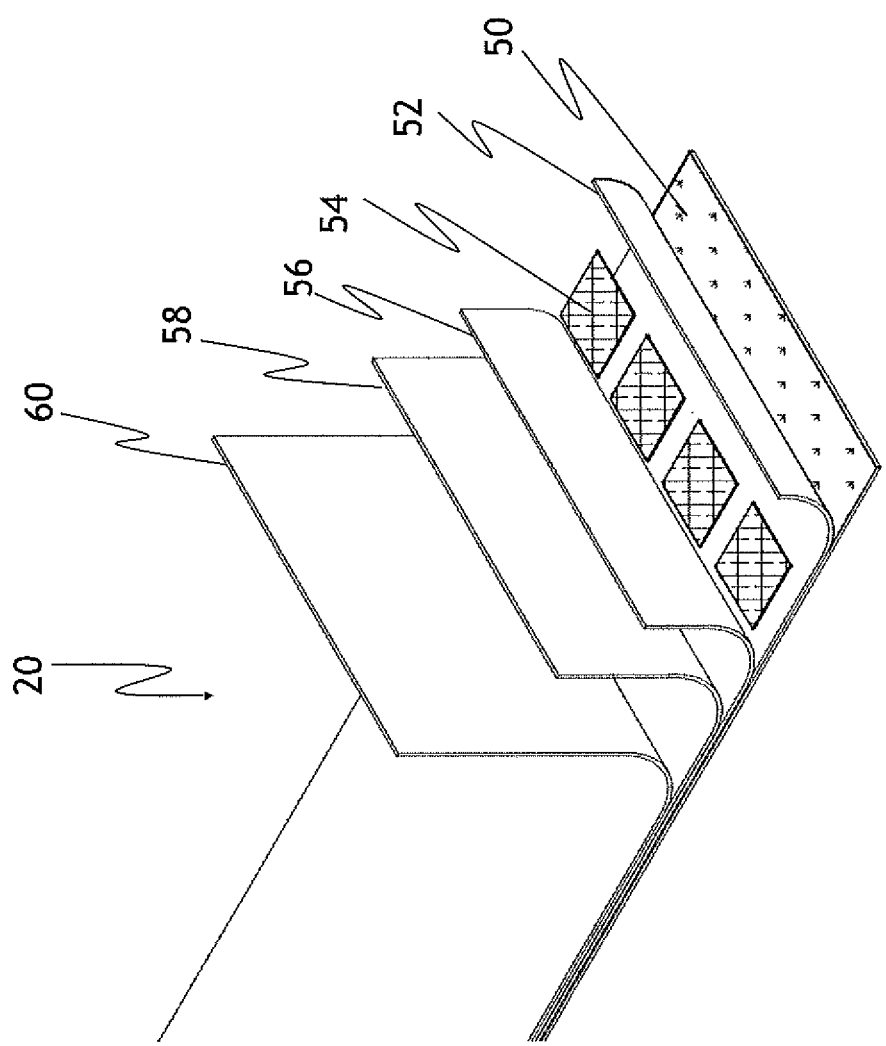

SOLAR SHINGLE ROOFING KIT

This application claims the benefit of U.S. Provisional Patent Application No. 62/345,223, filed May 3, 2016, which is incorporated by reference herein in its entirety.

TECHNICAL FIELD

The present disclosure relates the installation of solar panel modules on sloped roofs.

BACKGROUND ART

There are three main types of commercialized solar panels: monocrystalline silicon (Si), polycrystalline silicon (Si) and thin film. The two formers are crystalline solar panels. Monocrystalline Si solar panels have the highest efficiency rates since they are made out of the highest-grade silicon. The efficiency rates of monocrystalline Si solar panels are typically 16-22%. Monocrystalline Si solar panels are space-efficient. Since these solar panels yield the highest power outputs, they also require the least amount of space compared to any other types. Monocrystalline Si solar panels produce up to two times the amount of electricity as thin-film solar panels. Monocrystalline Si solar panels live the longest. Most solar panel manufacturers put a 25-year warranty on their monocrystalline Si solar panels.

The process used to make polycrystalline Si is simpler and costs less. The amount of waste silicon is less compared to the manufacturing process for monocrystalline Si wafers. Polycrystalline Si solar panels tend to have slightly lower heat tolerance than monocrystalline Si solar panels. This technically means that they perform slightly worse than monocrystalline Si solar panels in high temperatures. Heat can affect the performance of solar panels and shorten their life spans. However, this effect is minor. The efficiency of polycrystalline Si solar panels is typically 14-18%. Because of lower silicon purity, polycrystalline Si solar panels are not quite as efficient as monocrystalline Si solar panels. Polycrystalline Si panels have a lower space-efficiency. It is generally necessary to cover a larger surface to output the same electrical power as would a solar panel made of monocrystalline Si.

Both the monocrystalline and polycrystalline Si solar panels are constructed as large panels comprising many solar cells made from silicon wafers electrically connected together and sandwiched between a top layer of tempered glass treated with an antireflective coating and a back sheet. The sandwich structure is then surrounded and supported by a frame constructed from extruded aluminum alloy. The standardization of the panel sizes enables a manufacturer to realize increased economies of scale by mass manufacturing panels. The solar panels are manufactured in standard sizes of approximately 165 cm×95 cm×3.5 cm and would typically weigh 15-20 kg each, or 195 cm×95 cm×4 cm and weight 25-30 kg each. The panels which are produced are large, rigid and fragile. As such it would typically require two or more workers to move and install the panels. The conventional manner of mounting these solar panels is to install footings which are bolted to a roof. Bolting to a roof necessitates holes being punched through shingles with the potential for water leakage. Rails are attached to the footings. The solar panels are then fixed to the rails and sit suspended above the surface of the roof resting on the rails. On a sloped roof, rain can flow under the solar panels and off the roof. The solar panels are factory sealed and are impermeable to water. With solar panels suspended above the roof, there is a possibility of the panels lifting during high winds.

Thin film solar cells, also known as thin-film photovoltaic cells (TFPV) typically consist of multiple layers: an antireflective layer, followed by PV materials, then a contact plate and a substrate. Depositing one or several thin layers of photovoltaic material onto a substrate is the basic gist of how thin-film solar cells are manufactured. The different types of thin-film solar cells can be categorized by which photovoltaic material is deposited onto the substrate. Depending on the technology, thin-film module prototypes have reached efficiencies between 7-13% and production modules operate at about 9%. Future module efficiencies are expected to climb close to the about 10-16%. Some TFPV cells are more flexible and easier to handle than crystalline Si panels. High temperatures and shading have less impact on the performance of thin film solar. In situations where space is not an issue, thin-film solar panels can make sense. Thin-film solar panels are in general not very useful for in most residential situations. They require a lot of space. Monocrystalline Si solar panels produce up to two times the amount of electricity as thin-film solar panels for the same amount of space. Low space-efficiency also means that the costs of PV-systems (e.g. support structures and cables) will increase. Thin-film solar panels tend to degrade faster than mono- and polycrystalline solar panels, which is why they typically come with a shorter warranty.

United States Patent publication No. 2008/0190047 A1 (Allen) teaches a solar roofing kit for placing over a section of roof deck to generate electricity. The kit includes at least one panel having a support plate adapted to support the photovoltaic sheet; a rib extending from one edge of the support plate at a distal end; a received flange extending generally perpendicularly from the distal end of the rib over the support plate; and a hem extending from an opposite side of the support plate; where the hem is adapted to engage a receiver flange on another panel when the panel is mounted on the roof adjacent other panels. The rib extends a predetermined distance greater than the thickness of the photovoltaic sheet so that the receiver flange can extend over the photovoltaic material when it is installed on the support plate.

The solar roofing kit taught by Allen is based upon metal roofing technology, and would be easier to install on a roof than the large conventional crystalline Si solar panels which have many solar cells mounted together in a framed panel and the framed panel mounted on rails on a roof. The installed solar roofing kit has a tidy, low profile appearance. It is expected that the cost to manufacture the components taught by Allen would be quite high since they are not common mass produced articles or simple extrusions. Instead, they are formed sheet metal one by one and having a rather complex curvature.

This prior art solar roofing kit is an application for use with thin film solar module sheeting, not with crystalline Si solar cells or panels. This solar roofing kit has a sheet metal support plate adapted to support the photovoltaic sheet. There is a need for an improved solar roofing kit which will facilitate the installation of more energy efficient crystalline Si solar cells or panels.

There is a need for a system of crystalline Si solar panels which are smaller than the conventional framed panels and are easier to install. There is a need for a system of crystalline solar panels which can be installed on smaller, non-standard sized roofs and, if desired, integrated with the installation of standard shingles.

Crystalline solar panels have a sandwiched construction including a layer of tempered glass, which provides the necessary integral support to the solar panels. A sheet metal support plate is not required for using with crystalline Si solar panels. There is a need for a system of a solar roofing kit which does not incorporate a sheet metal support plate, which would be redundant if used with solar panels supported by tempered glass sheets.

There is a need for a solar roofing kit which takes advantage of mass production capabilities currently available for manufacturing the frames for conventional crystalline Si solar panels to cost effectively produce modular frame elements which will serve the dual purpose of framing the solar panels and mounting the solar panels to a roof.

In order to facilitate repair and maintenance of a solar roofing system, there is a need for a solar roofing kit for which it is relatively easy to replace one or more of the individual solar panels from the solar array on the roof. The splice plate in the kits taught by Allen that connects the left and right solar panels makes it be impossible to replace one failed solar panel in the array. Almost all of solar panels on roof would need to be removed if one failed in the first installed row of solar panels closing-in the eaves of roof. In order to avoid a single solar panel being imprisoned, a new kind of central connector is needed to avoid the connection method in prior art for solar panels to slide into and be connected by the splice plate from left and right sides.

SUMMARY OF THE INVENTION

A solar shingle roofing kit comprises a plurality of solar modules, a central connector for adjoining adjacent solar modules; a starting connector to join one of the plurality of solar modules to an eaves or a deck of a roof; a left closure to join one of the plurality of solar modules to a left rake edge of the roof or to other commercial shingles or roof tiles; a right closure to join one of the plurality of solar modules to a right rake edge of the roof or to other commercial shingles or roof tiles; a finishing connector to join one of the plurality of solar modules to a ridge of the roof; and, a plurality of clamps to fasten the frame supporting the solar panel laminate and the starting connector to a deck of the roof. Each of the solar modules comprises a solar panel laminate comprising crystalline silicon (Si) solar cell and a frame supporting the solar panel laminate. The frame supporting the solar panel laminate comprises an upper horizontal segment comprising a clamp-fit ridge positioned adjacent to a longitudinal channel, and a retaining groove to receive a horizontal edge of the solar panel laminate. The frame further comprises a lower horizontal segment defining a retaining groove to receive another horizontal edge of the solar panel laminate, and a ledge to receive the longitudinal channel of an upper horizontal segment of another solar module. The frame further comprises a first vertical segment defining a retaining groove to receive a vertical edge of the solar panel laminate, and a flatbed positioned parallel to and extending distally away from a back wall of the retaining groove A second vertical segment of the frame defines a retaining groove to receive another vertical edge of the solar panel laminate and a flatbed positioned parallel to and extending distally away from a back wall of the retaining groove. The second vertical segment is a mirror image of the first vertical segment. Four segments, the upper horizontal segment, the lower horizontal segment and two vertical segments, take shape of the frame. A sealant material is contained in each of the retaining grooves of the segments to seal the solar panel laminate in the frame.

The solar shingle roofing kit further comprises a plurality of shingles which are interchangeable with the solar modules. Each of the plurality of shingles has a rear upper edge and a front lower edge separated by an expanse of plate. The rear upper edge defines a clamp-fit ridge and a longitudinal channel formed adjacent to the clamp-fit ridge.

BRIEF DESCRIPTION OF THE DRAWINGS

FIG. 4 is a sectional view taken along line A-A in FIG. 2;

FIG. 5 is a sectional view of a solar panels and a shingle mounted to a roof;

FIG. 5A is an enlarged view of the portion of FIG. 5 marked by circle A;

FIG. 5B is an enlarged view of the portion of FIG. 5 marked by circle B;

FIG. 5C is an enlarged view of the portion of FIG. 5 marked by circle C;

FIG. 9 is a perspective view of a central connector shown in normal and exploded views;

FIG. 17 is a perspective view of a clamp; and,

FIG. 18 is a partially exploded view of a solar laminate.

DETAILED DESCRIPTION OF THE PREFERRED EMBODIMENTS

Figure 1:
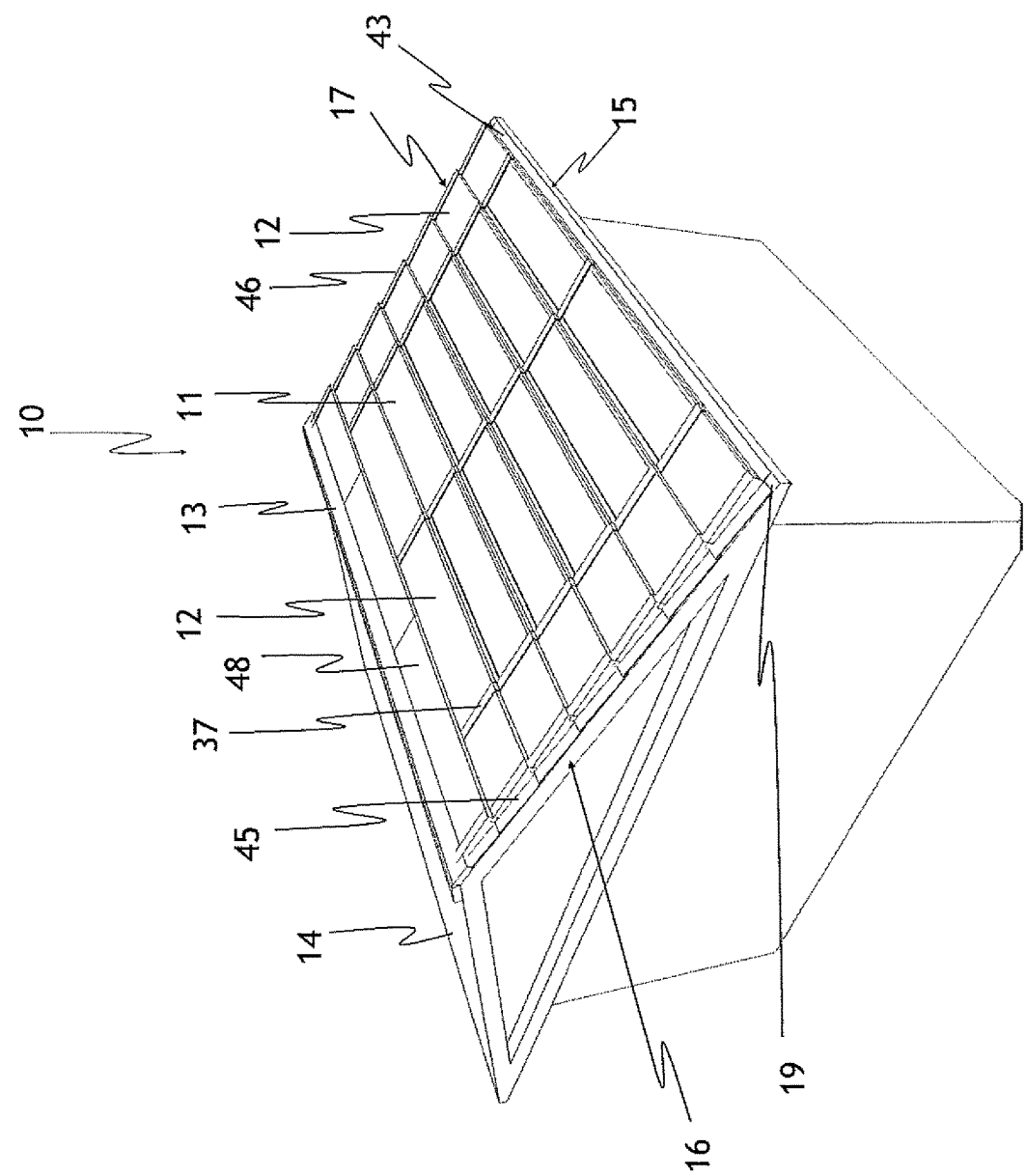
FIG. 1 is a partial perspective view of a building showing a portion of a roof in accordance with the present invention.
Figure 2:
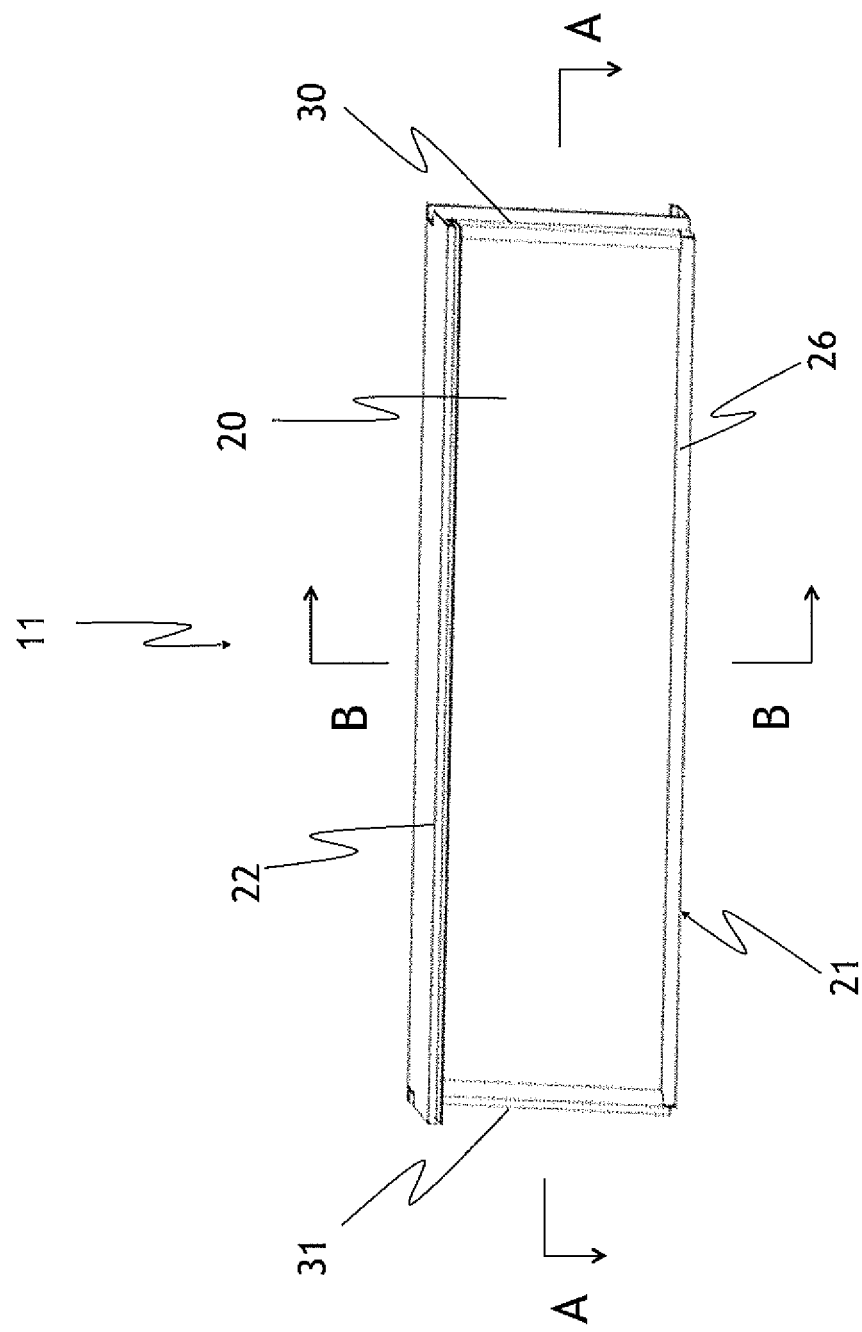
FIG. 2 is a perspective view of a solar module according to the present invention.

This invention is a solar shingle roofing kit for installing monocrystalline or multi-crystalline solar panel modules 11 on a roof deck to generate electricity shown generally by reference numeral 10. The solar modules 11 can be installed on a sloped roof and the modules can be cross-mixed with regular shingles 12 in a single installation. The solar modules 11 provide the functions of both covering roof and generating DC power. The shingles 12 provide only the function of covering the roof deck. The solar modules and shingles may be installed on a sloped roof to form an array, and their positions in the array can be cross-mixed. FIG. 1 illustrates showing a portion of a roof that has been covered using the solar shingle roofing kit of the present invention. As shown in FIG. 1 and FIG. 2, the solar modules 11 are generally rectangular in shape and have a fixed length and width. However, the length of shingles 12 can be equal to that of solar modules 11, and longer or shorter than that of solar modules 11. Laying a row parallel to the eaves 15 of a roof can be realized by connecting solar module 11 with solar module 11, or shingle 12 with shingle 12, or solar module 11 with shingle 12. In a row, the width of solar modules 11 and the width of shingles 12 are consistent. A central connecting component 37 is used to connect the left and right sides of a solar module 11 with a solar module 11, or a solar module 11 with a shingle 12, or a shingle 12 with a shingle 12. Since the length of a shingle 12 can be modified or changed, it can reach both rake edges 16/17 of the roof in a row laying. A left closure component 45 and a right closure component 46 are used to end a row laying at left side and right side of the row, respectively.

FIG. 2 shows a perspective view of the said solar module 11, which comprises a solar panel laminate 20 and a frame shown generally by reference numeral 21.

Details of the laminate structure of the solar panel laminate 20 are discussed in detail below with and shown in FIG. 18. The solar panel laminate 20 is a well known layer structure from which large scale solar panels are typically constructed. The first layer is a pane 50 of glass. The pane 50 is typically 2 to 8 millimeters thick and is constructed from solar glass. Solar glass has a roughened surface back surface to bond to other layers in the laminate and is a tempered glass with super good impact strength, and coated with an antireflection layer to reduce the loss of solar radiation. The pane 50 forms the protective glass surface of the laminate 20 which is exposed to the environment when the solar module 11 is installed. The pane 50 provides physical strength and rigidity and also UV screening to protect the sub layers of the laminate 20. A plurality of solar cells 54 along with eclectically conductive filaments to form an electrical circuit are encapsulated between a first layer 52 of ethylene vinyl acetate (EVA) and a second EVA layer 56. The first EVA layer 52 and the second EVA layer 56 are sealed together in a vacuum under compression. The solar cells 54 are trapped and "float" within the sealed layer EVA layers 52, 56. EVA film is excellent durability characteristics and can resist high temperatures and high humidity. A polyvinyl fluoride, polyethylene terephthalate composite backing sheet 58 completes the laminate structure. One suitable composite from which to form the backing sheet 58 is a polyvinyl fluoride (PVF) film marketed by DuPont under the trademark TEDLAR™. The composite backing sheet 58 is opaque. It is preferred, though not necessary for the laminate 20 to also have a high temperature back pane 60. The back pane 60 is constructed of basalt fiber or acrylic fiber which may be weaved with silicone material to form fireproof cloth. With this cloth, the solar panels meet the fire retardant standard of roofing shingles. The accepted safety standard for the back pane 60 is that it withstands an environment with a temperature of 780° C. for at least in 10 minutes without burning through. It is possible to combine the back sheet layer 58 and the back pane 60 in a single layer of high temperature materials. If without integrating the back 60 in the laminate 20, an underlayment layer made from the fireproof cloth may be laid between the deck 19 of roof and the solar shingle kit 10 in order to meet the fire retardant standard of roofing.

Figure 3:
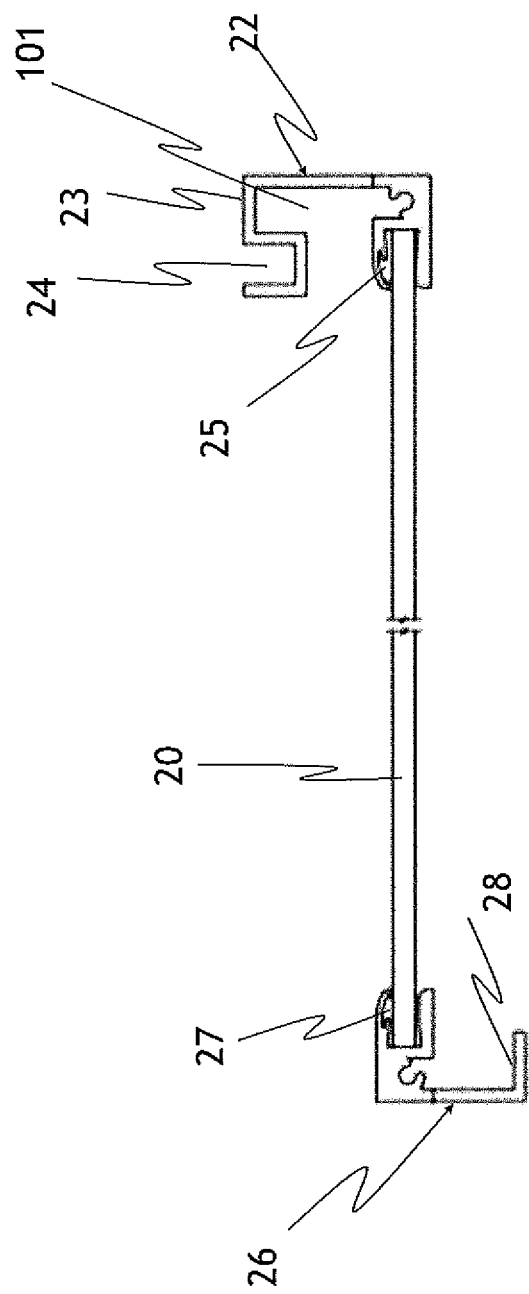
FIG. 3 is a sectional view taken along line B-B in FIG. 2.

Returning back to FIG. 2, FIG. 3 and FIG. 4. The frame 21 comprises four segments, an upper horizontal segment 22, a lower horizontal segment 26, a first vertical segment 30 and a second vertical segment 31. It should be understood that horizontal segments 22 and 26 are will run parallel to the ridge 13 of a roof 14 when the solar modules and shingles are installed on a roof. The upper horizontal segment 22 is at the upper edge of the solar module 11 when the solar module is installed on a roof. The upper horizontal segment 22 would be closer to the ridge 13 of the roof 14 when the solar module 11 is installed. The first vertical and second segments 30 and 31 run vertically along the left and right sides of the solar module when installed on a roof as discussed. FIG. 3 shows is an enlarged sectional view of the solar module 11 of FIG. 2 taken along line B-B. The upper horizontal segment 22 comprises a clamp-fit ridge 23 positioned adjacent to a longitudinal channel 24. The upper horizontal segment further defines a retaining groove 25 which will receive a horizontal edge of the solar panel laminate 20. The height of the retaining groove is slightly greater at its back wall than at its mouth to provide a friction fit when the solar panel laminate 20 is inserted into the retaining groove 25. The longitudinal channel has two functions. First, the longitudinal channel 24 provides a contact surface to engage and anchor the lower horizontal segment of the next row of solar modules 11. The second function is to provide discharge channel to collect any moisture which may condense on the backside of laminate 20 of the solar module that is in the next row above and whose lower horizontal segment 26 is hooked on this channel. The carried moisture water will flow through the holes opened on the bottom of this channel and down to the front surface of the laminate of solar panel with this channel. This discharge channel is to collect any moisture condensed from the backside of plate 67 of a shingle if it sits in the next up row, too. In FIG. 3, there is a recess 101 formed in upper horizontal segment 22, the function of which will be explained latter in FIG. 10.

The lower horizontal segment 26 further defines a retaining groove 27 which will receive a horizontal edge of the solar panel laminate 20. The height of the retaining groove 27 is slightly greater at its back wall than at its mouth to provide a friction fit when the solar panel laminate 20 is inserted into the retaining groove 27. The lower horizontal segment 26 further comprises a ledge 28. As can be seen in FIG. 5, the ledge 28 will receive and support the longitudinal channel 24 of the upper horizontal segment 22 of a solar module 11 installed on the next lower row on the roof. Thus each solar panel 11 module will physically engage the next lower solar panel module 11 once installed on the deck of the roof 14.

Turning to FIG. 4, the first vertical segment 30 of the frame 21 and the second vertical segment 31 are mirror images of one another. The vertical segment 30 defines a retaining groove 32. The vertical segment 31 has defines a retaining groove 33. The retaining grooves 32, 33 each receive a vertical edge of the solar panel laminate 20. The heights of the retaining grooves 32, 33 are both slightly greater at their respective back walls than at their mouths to provide a friction fit when the solar panel laminate 20 is inserted into the retaining groove 32, 33. The first vertical segment 30 defines a flatbed 34 parallel to the retaining groove 32 and extending distally away from its back wall. Likewise, the second vertical segment 31 defines a flatbed 36 parallel to the retaining groove 33 and extending distally away from its back wall. The two flatbeds 34, 36 facilitate the lateral connection of adjacent solar modules 11.

There is silicone based sealing material or tape introduced into each of the retaining grooves 25, 27, 32, and 33 when the solar panel laminate 20 is fit into the upper horizontal segment 22, the lower horizontal segment 26, the first vertical segment 30 and the second vertical segment 31 which together form frame 21 which surrounds and secures the laminate 20 creating the solar module 11. At the four corners of frame 21, screws or corner keys are applied to fasten the four segments together like as is widely practiced in normal solar panel manufacturing.

Figure 6:
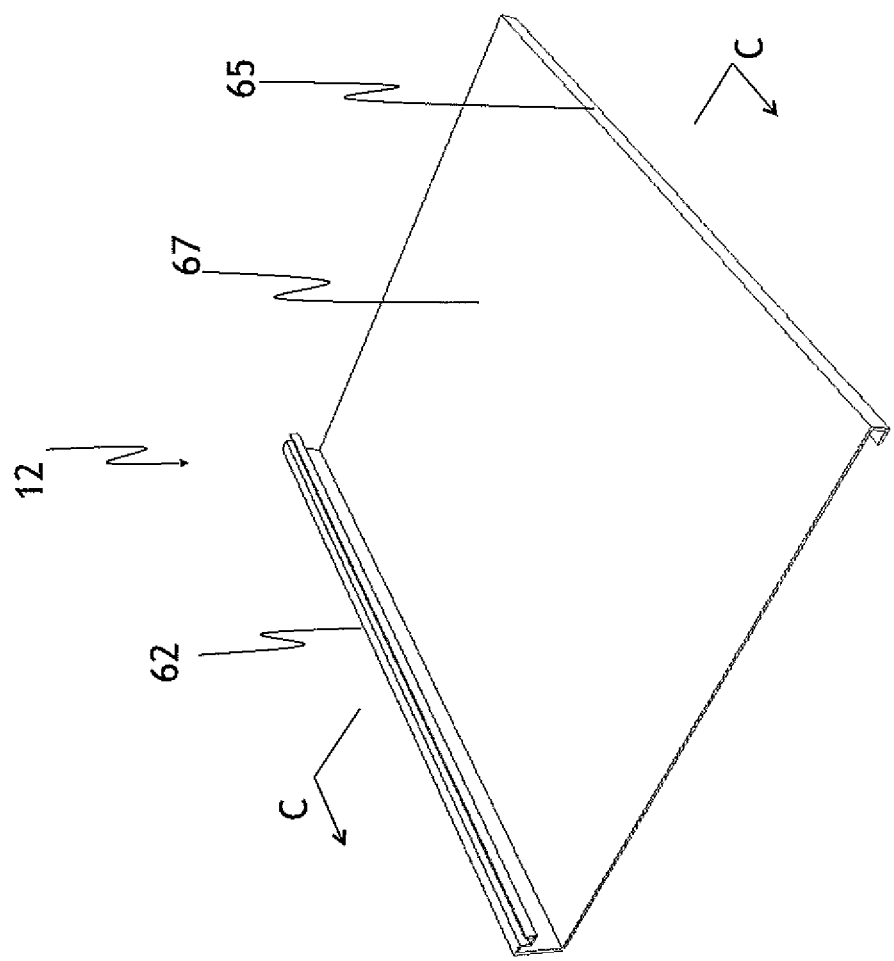
FIG. 6 is a perspective view of a shingle according to the present invention.
Figure 7:
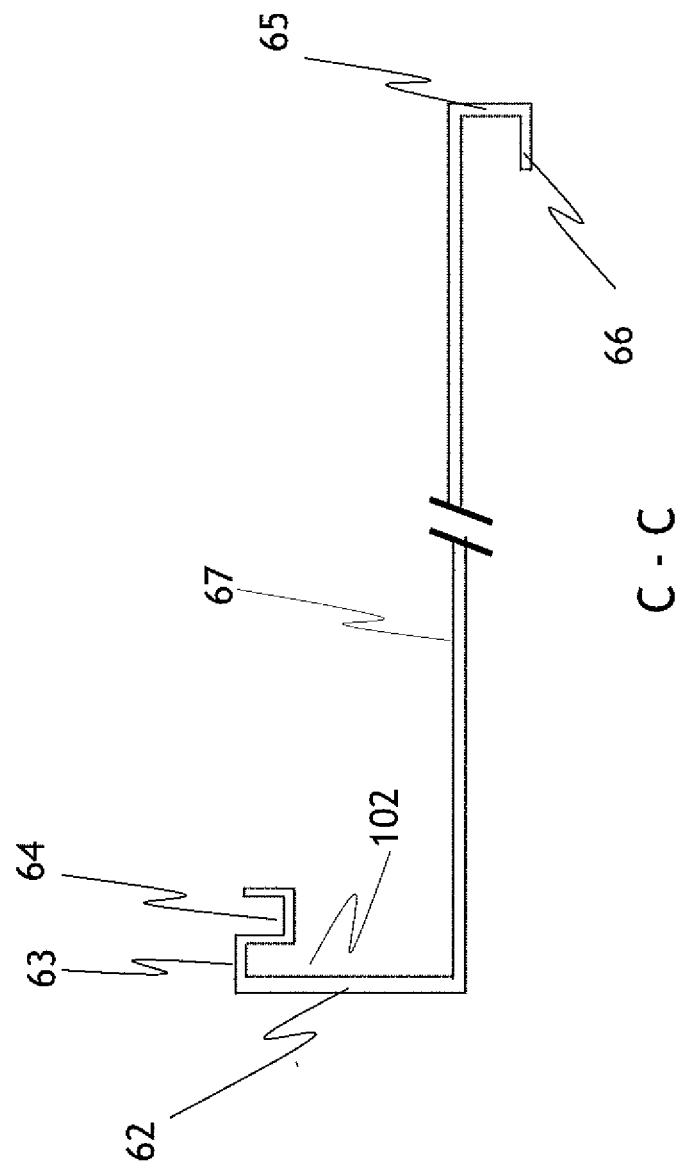
FIG. 7 is a sectional view taken along line C-C in FIG. 6.

FIG. 6 and FIG. 7 illustrate the features of the shingle 12, which can be intermixed with solar modules 11 during installation. The shingle 12 has a rear upper edge 62 and a front lower edge 65, separated by an expanse of plate 67. As can be seen in cross section in FIG. 7, the rear upper edge 62 comprises a clamp-fit ridge 63 and a longitudinal channel 64. The longitudinal channel 64 provides a contact surface to engage and anchor the lower horizontal segment of the next row of solar modules 11 or shingles 12. The longitudinal channel 64 also provides a discharge channel to collect any moisture which may condense on the backside of laminate 20 of the solar panel that is in the next row above and whose lower horizontal segment 26 hooked on this channel. The carried moisture water will flow through the holes opened on the bottom of this channel and down to the front surface of the plate 67 of shingle with this channel. This discharge channel will collect any moisture from the backside of plate 67 of a shingle which is in the next up row, too. The front lower edge 65 is bent to form a hook flange 66. In FIG. 7, there is a recess 102 formed in the rear upper edge 62, the function of which will be explained latter in FIG. 9 and FIG. 10. The rear upper edge of a shingle is positioned on roof to adjacently align to the upper horizontal segment of a solar panel, or the rear upper edge of another shingle. The front lower edge consists of a ledge, which is placed on roof to adjacently align to the lower horizontal segment of a solar panel, or the front lower edge of another shingle. The ledge of the front lower edge of a shingle can receive a longitudinal channel of both the rear upper edge of another shingle and the upper horizontal segment of a solar panel. The longitudinal channel of a shingle can be received by either the ledge of the front lower edge of another shingle or the ledge of the lower horizontal segment of a solar panel.

The clamp-fit ridge 63 provides a raised profile to mate with a mounting clamp 18, which is itself fixed onto the deck 19 of the roof by roof screw.

Figure 8:
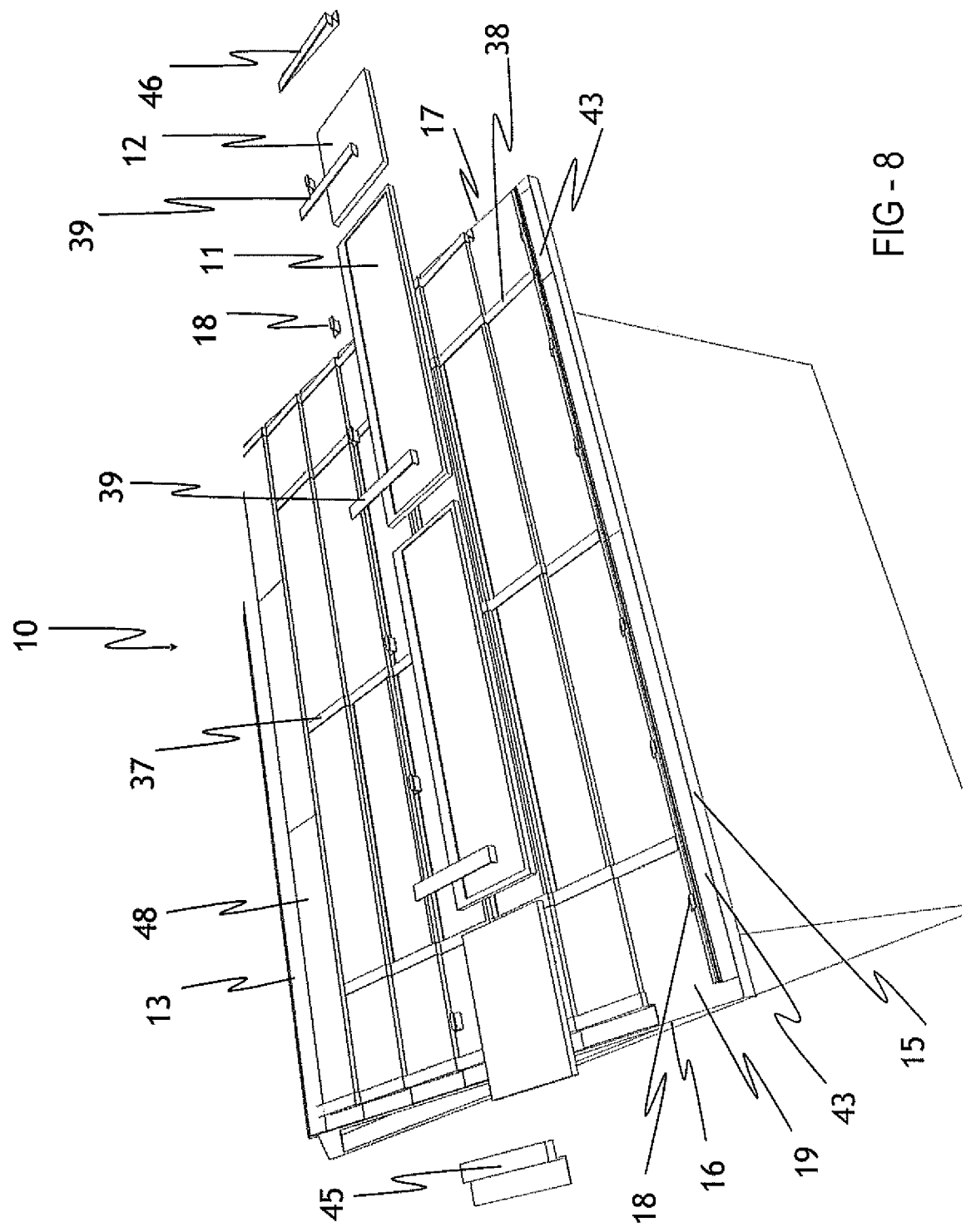
FIG. 8 is a partially exploded perspective view of a portion of a building showing a portion of a roof in accordance with the present invention.

FIG. 8 is a partially exploded view of a portion of a roof 14 on a building. Having described in detail the features of the solar modules 11 and the shingles 12, the following description explains the connecting elements which are used to connect solar modules 11 and shingles 12 when they are laid side by side in rows installed on a roof 14. A central connector 37 is used to connect either a solar module 11 or a shingle 12 to the adjacent solar module 11 or shingle 12. It should be understood that the central connector 37 comprises mating elements which can interchangeably engage either a solar module 11 or a shingle 12. Specialized connecting elements are provided to make the remaining connections. A starting connector 43 anchors the first row of solar modules and/or shingles to eaves 15. A left closure 45 connects to the left most solar module or shingle in the row to secure it to the left rake edge 16 of the roof. A right closure 46 connects to the left most solar module or shingle in the row to secure it to the right rake edge 17 of the roof 14. A finishing connector 48 connects to the uppermost row of shingles or solar modules to the ridge 13 of the roof 14. The solar modules 11 and shingles 12 are held down to the deck 19 of the roof 14 by means of clamps 18.

FIG. 9 shows the central connector 37 in perspective and exploded views. The central connector 37 comprises a lower rail 38 detachably connected to a cover 39. In cross section, the rail 38 defines a raised platform 41, set between two parallel drainage channels 42. The drainage channels 42 allows for the collection and discharge of any water which might leak down from the cover 39. The draining channels 42 are bounded at their respective distal edges by a pair of shelves 40. The height of each shelf 40 is less than the height of the raised platform 41. Two nuts 100 are embedded in the raised platform 41 to receive two bolts through two holes 99 on the cover 39 in order to clamp a lower rail 38 and a cover 39 together.

Still in FIG. 9, there are a front wall 97 and a rear wall 98 perpendicular to surface and at the two ends of the cover 39, which prevent the two ends of rail 38 from direct exposure to the snow or rain. The front wall 97 extends toward the rail 38, and canopies the front end of rail 38 and the lower horizontal segment 26 of frame 22 of the solar module 11 when installed. The rear wall 98 rises from the surface of the cover 39 and extends away from the front wall 97. The rear wall 98 will sit in the recess 101 formed by the upper horizontal segment 22 of the frame 21 of solar module 11. Alternatively the rear wall will sit in the recess 102 of a rear upper edge 62 of the shingle 12, and blocks the snow or rain possibly moving to the end of rail 38.

Figure 10:
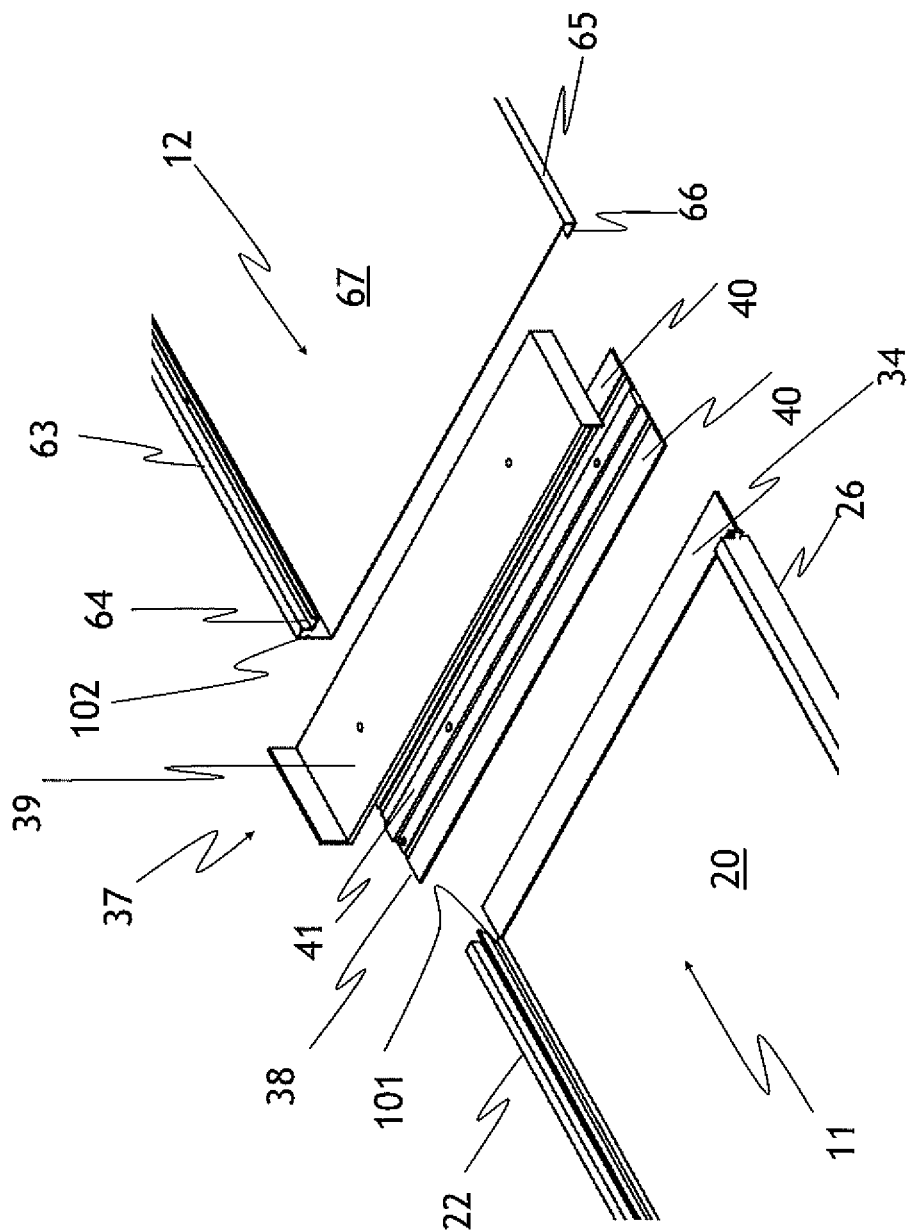
FIG. 10 is an exploded view of a solar module joined to a shingle by a central connector.

FIG. 10 shows an enlarged exploded view of a solar module 11 connected to an adjacent shingle 12. When the central connector 37 is connected to a solar module 11, the flatbed 34 of the solar module 11 rests one of the shelves 40 of the central connector 37. When the central connector 37 is connected to a shingle 12 the shelf 40 supports a portion of the plate 67 and is retained within the hook flange 66 of the shingle 12. Since the height of the shelf 40 is less than the height of the raised platform 41 of the rail 38, there is room to rest either the flatbed 34 of a solar module 11 or the plate 67 of a shingle 12 without exceeding the height of the raised platform 41. As shown in FIG. 9, the cover 39 is connected to the rail 38 of the central connector 37 by means of using two bolts through the holes 99 of the cover 39 to engage the embedded nuts 100 on the rail 38. The cover 39 is sufficiently wide to cover the entirety of the rail 37 and the flatbeds 34/36 of the two adjacent solar modules 11 or portions of the shingle plates 67 as the case may be. The front wall 97 of the cover 39 canopies the front end of rail 38 and a portion of the lower horizontal segment 26 of a solar module 11 and a portion of front lower edge 65 of a shingle 12. The rear wall 98 of the cover 39 is inserted into the recesses 101, 102 formed from the upper horizontal segment of frame 22 of solar panel and the rear edge of shingle 64. Both front wall 97 and rear wall 98 prevent the front/rear ends of rail 38 to be directly exposed to the snowing or raining.

Figure 11:
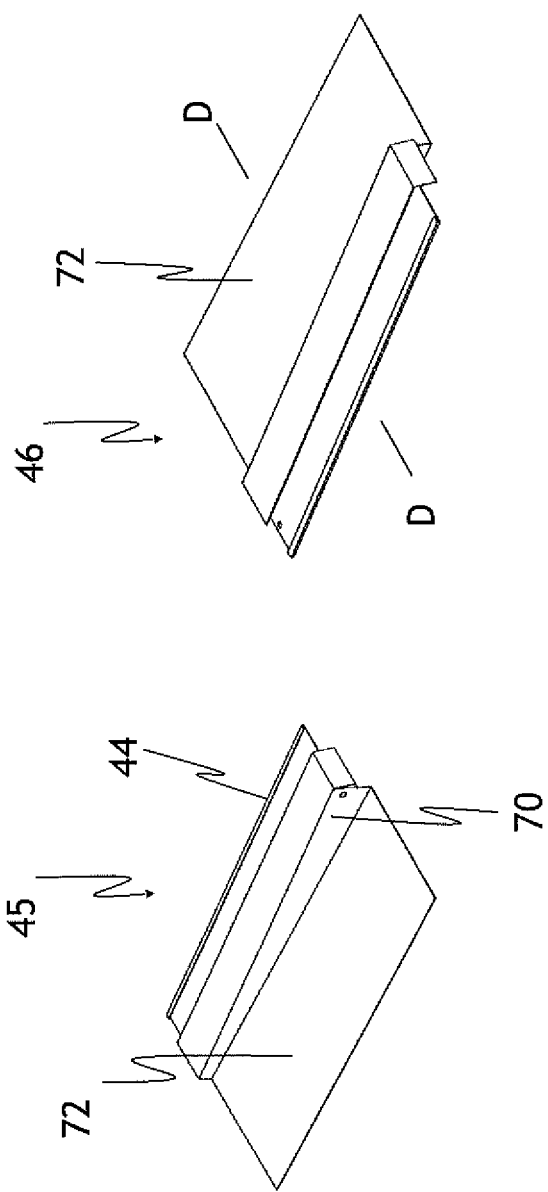
FIG. 11 is a perspective view of a left closure and a right closure.
Figure 12:
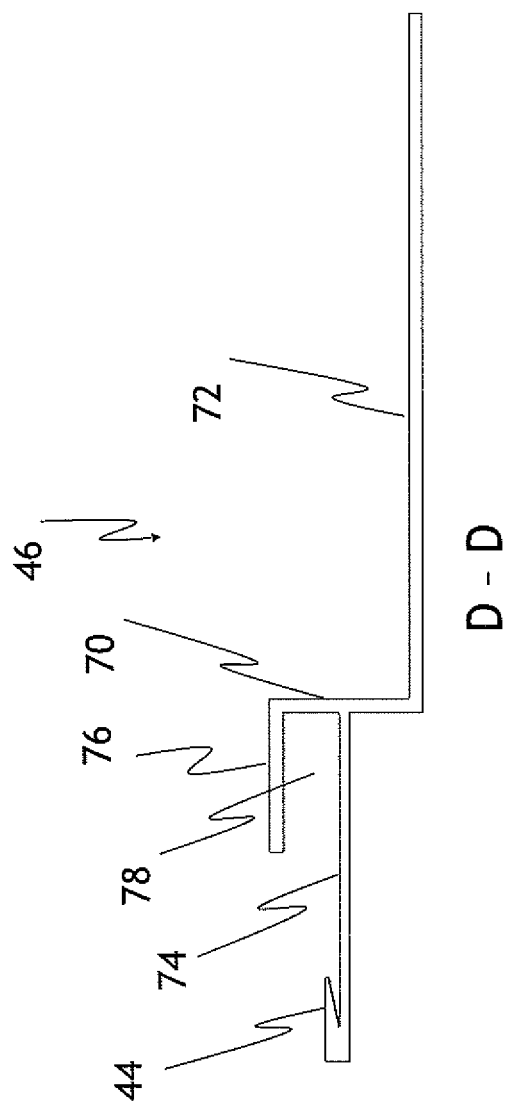
FIG. 12 is a perspective view of a right closure of FIG. 11 taken along line D-D.

FIG. 11 shows the left closure 45 and the right closure 46. FIG. 12 is a sectional view of the right closure taken along line D-D. Since the left closure 45 and the right closure 46 are mirror images of one another only the right closure 46 will be described and explained in detail and the same reference numerals will be used to define the respective substructures of both closures 45, 46. The closure comprises a vertical plate 70. A distal horizontal base 72 projects from the vertical plate 70 in the direction that will be nearest to the right rake edge 17 of the roof 14. A proximal shelf 74 projects in the opposite. The proximal shelf 74, together with a horizontal overhang 76 and the vertical plate 70 together form a slot 78 for receiving either the flatbed 34 of a solar module 11 or a portion of the plate 67 of a shingle 12. The distal horizontal plate 72 will touch and be fixed on the deck 19 by roof screws, which may be covered by a flashing at the right rake edge 17 of roof 14 or connected by other commercially available roof shingles or roof tiles overlaying it.

Figure 13:
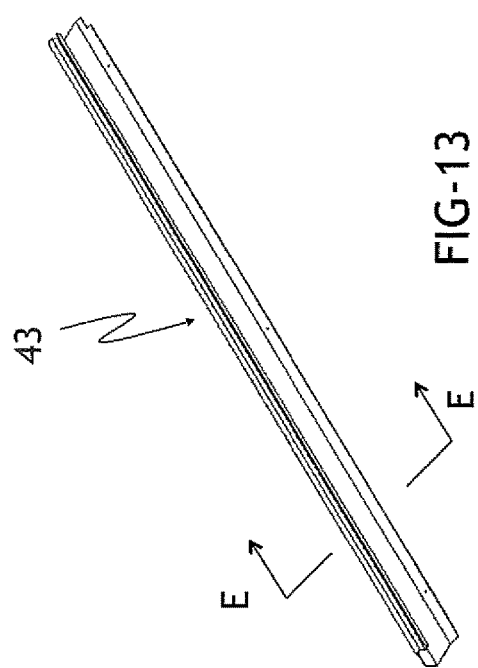
FIG. 13 is a perspective view of a starting connector.
Figure 14:
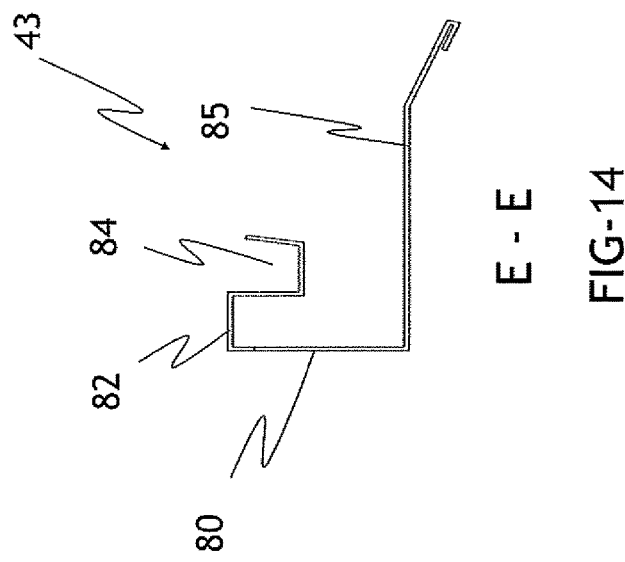
FIG. 14 is a sectional view of the starting connector of FIG. 13; taken along line E-E.

In FIG. 13 shows a perspective view of the starting connector 43. A cross section taken along line E-E is shown in FIG. 14. The starting connector 43 comprises vertical extension plate 80. A horizontally oriented clamp-fit ridge 82 extends from the vertical extension plate 80 and a horizontal channel 84 is formed adjacent thereto. The horizontal channel 84 provides an anchor for the lower horizontal segment 26 of frame 21 of the first row of solar modules 11 and/or the front lower edge of shingles 12. The horizontal channel 84 also collects and discharges any water which may condense on the back side of laminate 20 of the solar modules 11. The height of the vertical plate 80 can be consistent with the height of the upper horizontal segment 22 of frame 21 of solar module 11. A base plate 85 extends from the vertical extension plate 80 to provide a horizontal surface which can be fastened by conventional fastening means such as roof screws to the deck 19 of the roof. A small overhang depends at an angle from the base plate 85 to overlap the eaves 15.

Figure 15:
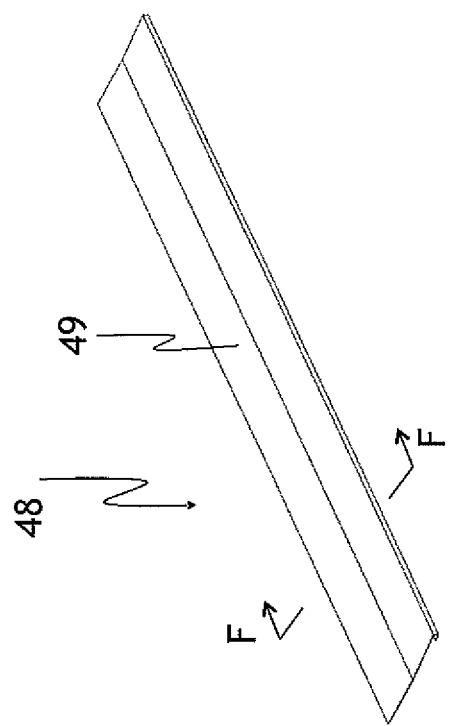
FIG. 15 is a perspective view of a finishing connector.
Figure 16:
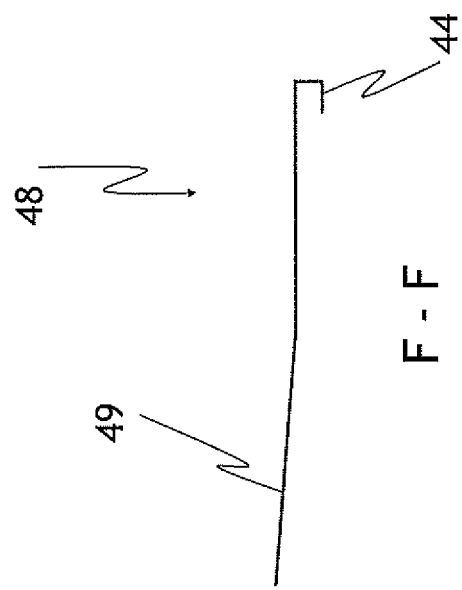
FIG. 16 is a sectional view of the finishing connector of FIG. 15 taken along line F-F.

Referring to FIG. 15, the finishing connector 48 is shown in perspective view and in cross section along line F-F. The finishing connector 48 comprises a transitional panel 49 which may be attached to a commercial ridge flashing at the ridge 13 of the roof, or fixed to the deck 19 of the roof 14 by roof screws to provide an under layer for other kinds of commercial roof shingles or tiles laid on it. The transitional panel 49 is folded along its longitudinal edge to form a flange hook 44. The flange hook 44 is used to hook into the longitudinal channel 24 of the upper horizontal segment 22 of the frame 21 of the solar module 11. Alternatively if there is a shingle 12 in the last row, the hook 44 will hook and be retained into the longitudinal channel 64 at the upper edge 62 of the shingle 12.

Turning now to FIG. 17 and FIG. 5, a clamp 18 is used to secure the upper horizontal segment 22 of frame 21, or the rear upper edge 62 of a shingle 12, or the clamp-fit ridge 82 of a starting connector 43 to the deck 19 of the roof 14. The clamp 18 has a horizontal base 86 which may define a plurality of openings to facilitate the through passage of fasteners such as roof screws or nails to permit the clamp 18 to be fastened to the deck 19. A riser 88 extends from the horizontal base 86 with an angle related to the angle between the laminate of solar module 11 or the plate 67 of shingle 12 and the deck of roof 19. A horizontal overhang 90 extends from the riser 88. The horizontal overhang 90 is oriented perpendicularly to the riser 88, but extends away from the horizontal base 86. A skirt 92 depends at an oblique angle to the horizontal overhang 90. The riser 88, the horizontal overhang, and the skirt 92 together define a recess 94 which is sized and positioned to matingly engage any one of the clamp-fit ridge 63 of shingle 12, the clamp-fit ridge 82 of starting connector 43, or the clamp-fit ridge 23 of the upper horizontal segment 22 of frame 21. To avoid too much tension introduced in fastening the solar modules 11 on the deck 19 with the clamp 18, the height of the riser 88 is designed to be equal to the sum of the height of the upper horizontal segment 22 of the frame 21 of the solar module 11 and the height of the rail 38 (3 mm ~10 mm) of central connector 37. FIG. 5B shows the mating engagement between the recess 94 of clamp 18 with the clamp-fit ridge 23 of the upper horizontal segment 22 of solar module 11 and with the clamp-fit ridge 63 of shingle 12. FIG. 5A shows the mating engagement of the rear upper edge 62 of a shingle 12 with the lower horizontal segment 26 of the frame 21 of a solar module 11 above it. FIG. 5C shows the mating engagement of two solar modules 11,11. Each connection completed using the clamp 18 is analogous to those shown in FIG. 5. A small tongue plate 96 projects from the horizontal base 86 at a height raised above the plane of the horizontal base 86. The tongue plate 96 raises and supports the rear upper edge 62 of the shingle 12 or the upper horizontal segment 22 of the frame 21 of the solar module 11 above the level of the deck 19 of the roof 14. In this manner a space is maintained between shingle or solar panel and the deck to allow interconnecting cables to pass along under the tongue plate 96.

In accordance with the present invention is preferred for all of the components of the frame 21 of the solar module 11, and all components of the central connectors 37, the left closure 45, the right closure 46, and the finishing connector 48, to be constructed from an electrically insulating material. From the view point of low cost manufacturing and the structures of components, all of the components of the frame 21 and the finishing connector 48 are preferably to be made by means of extrusion technology; while, all components of the central connectors 37, the left closure 45 and the right closure 46 are preferably by means of compression molding or injection molding technologies. The electrically insulating material must also be flame retardant. Suitable materials may be selected from the group consisting of fibreglass based material, nylon based materials and polyurethane mixed with flame retardant material, and composites of the foregoing. For example, Nylon 6 and Nylon 6/6, which may be mixed with flame retardant material, are candidates to manufacture those components, by means of extrusion, i.e. the frame 21 and finishing connector 48. Sheet molding compound (SMC), a ready to mould glass-fibre reinforced polyester material primarily used in compression moulding may also be used to manufacture the components. PAGF30, a compound of nylon and fibreglass, is also a preferred material for manufacturing the central connectors 37, the left closure 45 and the right closure 46 by molding technologies. Significant cost savings and standardization can be achieved through the use of extrusion if the manufactured components are long and with two-dimensional feature; otherwise, it can be achieved by molding methods if the manufactured components are with three-dimensional features. The contours of the components have been designed to maximize interchangeability, and to connect together in analogous fashions to simplify the installation process and make it more intuitive for installers to learn installation techniques and complete projects efficiently.

In this invention, the frame 21, the central connectors, left closures, right closures and finishing connectors could be constructed of metal. For example, aluminum extrusion methods could be used to form these components, and the height temperature back pane of the laminate 20 of the solar module 11 could be constructed from steel sheet. The use of metal components makes it more complicated to connect the circuitry of the solar shingle kit. All component parts would have to be connected together using grounding lugs.

Reference is now made to FIG. 1, FIG. 5 and FIG. 8. In use, the solar shingle roofing kit 10 is installed on a sloped roof 14 starting close to the eaves 15. The starting connector 43 is fastened on the deck 19 by the clamps 18 on its clamp-fit ridge and roof screws on its base plate. Also in FIG. 1, FIG. 2 FIG. 3, FIG. 6 and FIG. 7, the laying along the sloped of roof is started by fixing a starting component 43 on the roof close to the eaves. This starting component 43 provides an anchor for the first row of solar modules 11 or shingles 12 to hang with their front lower edges. The upper horizontal segments 22 of the solar panels 11 or the rear upper edges 62 of the shingles 12 will be fixed on the roof by using a plurality of clamps 18. The rear upper edges of a front row of solar modules 11 or shingles 12 will provide an anchor for the second row of solar modules 11 or shingles 12. The lower horizontal segment 26 of second solar module 11 will engage with the upper horizontal frame segment 22 of the first row solar module. More specifically, the longitudinal channel 24 of the upper horizontal segment 22 will rest on the ledge 28 of the lower horizontal segment. Also in FIG. 17, the riser 88 of the clamp 18 matches the height of the upper horizontal segment 22 and the horizontal overhang 90 overlies the clamp-fit ridge 23. The depending skirt 92 of the clamp 18 rests within the longitudinal channel 24 of the upper horizontal segment 22. Alternatively, if a shingle 12 is being joined to the first row, the depending skirt 92 of the clamp 18 rests within the longitudinal channel 64 of the shingle 12. Successive rows of shingles/solar modules are laid iteratively in the same manner to reach the ridge 13 of the roof 14. The finishing connector 48 is fixed to the deck 19 using roof screws and the longitudinal channel 24 of the upper horizontal segment of the last row of modules 11 and/or shingles 12 will rest within the flange hook flange 44. A central connector is for connecting adjacent two components from its left and right sides, which may be two solar panels, or a solar panel and a shingle, or two shingles. A central connector consists of a lower rail and a cover, which clamp two components from left and right sides. The rail holds up the ends of two components from its left side and right side. The cover sits on the rail and the ends of two components.

A solar module or a shingle in the array can horizontally be released by taking off the covers of central connectors at its left and right ends; and then it can be taken off by removing the clamps on its ridge at rear and slipping away its ledge from the received longitudinal channel of another component at front.

I claim:

1. A solar shingle roofing kit comprising:
   (a) a plurality of solar modules, each comprising a solar panel laminate comprising a crystalline solar cell, and a frame supporting the solar laminate, said frame comprising an upper horizontal segment comprising a clamp-fit ridge positioned adjacent to a longitudinal channel, and a retaining groove to receive a horizontal edge of the solar panel laminate; a lower horizontal segment defining a retaining groove to receive a horizontal edge of the solar panel laminate; and a ledge to receive and support the longitudinal channel of an upper horizontal segment of another solar module; a first vertical segment defining a retaining groove to receive a vertical edge of the solar panel laminate and a flatbed positioned parallel to and extending distally away from a back wall of the retaining groove; and a second vertical segment, being a mirror image of the first vertical segment, defining a retaining groove to receive a vertical edge of the solar panel laminate and a flatbed positioned parallel to and extending distally away from a back wall of the retaining groove;
   (b) a central connector for adjoining adjacent solar modules when laid side by side in rows; said central connector comprising a rail defining a central raised platform; a first shelf to receive the flatbed of a first vertical segment of the solar module or a portion of the plate of the shingle; and, a second shelf to receive the flatbed of the second vertical segment of another solar module or a portion of the plate of the shingle; and, a cover affixed to the rail to cover the raised platform of the rail, the first shelf, the second shelf and the flatbeds of vertical segments of the solar modules or the portions of plates of the shingles;
   (c) a starting connector to join one of the plurality of solar module to an eaves or a deck of a roof;
   (d) a left closure to join one of the plurality of solar modules to a left rake edge of the roof or to other commercial shingles or roof tiles;
   (e) a right closure to join one of the plurality of solar panel modules to a right rake edge of the roof or to other commercial shingles or roof tiles;
   (f) a finishing connector to join one of the plurality of solar panel modules to a ridge of the roof or to other commercial shingles or roof tiles; and, (g) a plurality of clamps to fasten the frame supporting the solar panel laminate and the starting connector to the deck of the roof.

2. The solar shingle roofing kit of claim 1, wherein the central raised platform of the rail of the central connector further comprises a plurality of nuts embedded therein; and the height of the first shelf and the height of the second shelf each being less than the height of the raised platform by a distance equal to the thickness of the flatbed of the first vertical segment or second vertical segment of the frame supporting the solar panel laminate.

3. The solar shingle roofing kit of claim 2, wherein the cover defines a plurality of holes aligned with the embedded nuts on the raised platform of the rail to receive a plurality of bolts to clamp the rail and the cover together.

4. The solar shingle roofing kit of claim 3, wherein the cover further comprises a rear wall perpendicular to the surface of the cover and extending for insertion into the recess of the upper horizontal segment of the frame of the solar module; and,
a front wall extending to a height greater than the height of the lower horizontal segment of the frame of the solar module.

5. The solar shingle roofing kit of claim 1, wherein the rail further defines a drainage channel adjacent to the first shelf.

6. The solar shingle roofing kit of claim 5, wherein the rail further defines a second drainage channel adjacent to the second shelf.

7. The solar shingle roofing kit of claim 1, wherein the left closure comprises a vertical plate having a horizontal overhang; a distal horizontal base projecting from the vertical plate for attachment to the deck of the roof; and a proximal shelf projecting from the vertical plate adjacent the vertical overhang; the vertical plate, the horizontal overhang and the proximal shelf together forming a slot for receiving the flatbed of a solar module.

8. The solar shingle roofing kit of claim 1, wherein the right closure comprises a vertical plate having a horizontal overhang; a distal horizontal base projecting from the vertical plate for attachment to the deck of the roof; and a proximal shelf projecting from the vertical plate adjacent the vertical overhang; the vertical plate, the horizontal overhang and the proximal shelf together forming a slot for receiving the flatbed of a solar module.

9. The solar shingle roofing kit of claim 1, wherein the starting connector comprises a vertical extension plate; a base plate extending therefrom for attachment to the roof deck; a horizontally oriented clamp-fit ridge extending from the vertical extension plate; and a horizontal channel to collect and discharge moisture which may condense on a back side of the solar panel laminate of a solar module; said horizontal channel being formed adjacent to the clamp-fit ridge and positioned to rest on the ledge of the lower horizontal segment of the frame of the solar module.

10. The solar shingle roofing kit of claim 1, wherein the finishing connector comprises a transitional panel for attachment to a flashing at the roof ridge or on the roof deck; the transitional panel being folded along a longitudinal edge thereof to form a flange hook for retention in the longitudinal channel of the upper horizontal segment of the solar module.

11. The solar shingle roofing kit of claim 1 wherein each of the plurality of clamps comprises a horizontal base having means for attachment to the deck of the roof; a riser extending from the horizontal base; a horizontal overhang extending from the riser; and a skirt depending from the horizontal overhang; the riser, the horizontal overhang and the skirt together defining a recess sized and positioned to matingly engage the clamp fit ridge of the shingle, the clamp-fit ridge of the upper horizontal segment of the frame of the solar module; or, the clamp-fit ridge of the starting connector.

12. The solar shingle roofing kit of claim 11, wherein the height of riser of the clamp approximately equals the sum of the height of the upper horizontal segment of the frame of the solar module and the height of the rail of the central connector.

13. The solar shingle roofing kit of claim 12, wherein the clamp further comprises a tongue plate projecting from the horizontal base at a height raised above the plane of the horizontal base; said tongue plate sized and positioned to support the upper horizontal segment of the frame of the solar module above the plane of the horizontal base; whereby a connecting cable for the solar module may pass under the tongue plate.

14. The solar shingle roofing kit of claim 1 further comprising a plurality of shingles being interchangeable with the solar modules; said plurality of shingles each having a rear upper edge and a front lower edge separated by an expanse of plate; said rear upper edge defining a clamp-fit ridge and a longitudinal channel being formed adjacent to the clamp-fit ridge and positioned to rest on the ledge of the lower horizontal segment of the frame of the solar module.

15. The solar shingle roofing kit of claim 1, wherein the solar panel laminate further comprises a flame retardant layer.

16. The solar shingle roofing kit of claim 15, wherein the flame retardant layer is constructed from a fireproof cloth selected from the group comprising made basalt fiber cloth, acrylic fiber woven with silicone.

17. The solar shingle roofing kit of claim 1, further comprising a fireproof cloth to underlie the solar modules and the shingles.

* * * * *